United States Patent
Oliebos et al.

(10) Patent No.: US 12,279,557 B2
(45) Date of Patent: Apr. 22, 2025

(54) PISTON LOCK SYSTEM FOR AGRICULTURAL EQUIPMENT

(71) Applicant: CNH Industrial America LLC, New Holland, PA (US)

(72) Inventors: Tim Oliebos, Eke (BE); Stijn Bailliu, Eernegem (BE); Bjorn Depoortere, Zwevezele (BE)

(73) Assignee: CNH Industrial America LLC, New Holland, PA (US)

( * ) Notice: Subject to any disclaimer, the term of this patent is extended or adjusted under 35 U.S.C. 154(b) by 762 days.

(21) Appl. No.: 17/520,223

(22) Filed: Nov. 5, 2021

(65) Prior Publication Data

US 2023/0146262 A1   May 11, 2023

(51) Int. Cl.
*A01D 41/14*   (2006.01)
*A01D 61/00*   (2006.01)
*F15B 15/26*   (2006.01)

(52) U.S. Cl.
CPC ......... *A01D 41/145* (2013.01); *A01D 61/008* (2013.01); *F15B 15/26* (2013.01)

(58) Field of Classification Search
CPC .... A01D 41/145; A01D 61/008; A01D 75/20; F15B 15/26; F15B 15/261; F16F 9/346; F16F 9/061; F16F 9/062; F16F 9/063; F16F 9/067
See application file for complete search history.

(56) References Cited

U.S. PATENT DOCUMENTS

| | | | |
|---|---|---|---|
| 3,730,362 A | 5/1973 | Hurlburt et al. | |
| 3,995,761 A | 12/1976 | Hurlburt et al. | |
| 4,078,779 A * | 3/1978 | Molders | F16F 9/0254 188/300 |
| 4,529,215 A | 7/1985 | Strand | |
| 4,811,983 A * | 3/1989 | Watts | F16F 9/0254 248/407 |

(Continued)

FOREIGN PATENT DOCUMENTS

| | | |
|---|---|---|
| CN | 104632781 A | 5/2015 |
| CN | 213870528 U | 8/2021 |

(Continued)

OTHER PUBLICATIONS

Extended European Search Report and Written Opinion for EP Application 22205794.5 dated Mar. 2, 2023 (six pages).

*Primary Examiner* — Thomas B Will
*Assistant Examiner* — Robert E Pezzuto
(74) *Attorney, Agent, or Firm* — Peter K. Zacharias; Rebecca L. Henkel; Rickard K. DeMille

(57) ABSTRACT

A piston lock system comprising: a cylinder, a rod receiver fixed to the cylinder, a piston slidably mounted to the cylinder, and a rod fixed to a free end of the piston and extending parallel to the piston to be located within the rod receiver. The piston and rod are movable relative to the cylinder and rod receiver between a retracted position and an extended position. A lock pin is mounted to the rod receiver and movable between a unlocked position in which the lock pin does not intersect a path of the rod, and a locked position in which the lock pin intersects the path of the rod and prevents the rod and piston from moving to the retracted position. Lock pins of multiple actuators can be connected to operate in unison.

20 Claims, 7 Drawing Sheets

(56) References Cited

U.S. PATENT DOCUMENTS

| | | |
|---|---|---|
| 9,380,744 B2 | 7/2016 | Dilts |
| 2008/0110166 A1* | 5/2008 | Stephenson ............. F15B 21/14 |
| | | 60/414 |
| 2020/0217104 A1 | 7/2020 | Hunt et al. |

FOREIGN PATENT DOCUMENTS

| | | |
|---|---|---|
| DE | 2706442 A1 | 8/1978 |
| DE | 102004042126 A1 | 3/2006 |
| EP | 1473467 A1 | 11/2004 |
| EP | 2740346 A2 | 6/2014 |
| JP | 2006168851 A | 6/2006 |

* cited by examiner

PISTON LOCK SYSTEM FOR AGRICULTURAL EQUIPMENT

BACKGROUND OF THE INVENTION

Agricultural equipment, such as combine harvesters that are used to gather agricultural crops, typically have a header that is configured to remove the crop material from the ground, and a feeder that conveys the crop material to the main body of the vehicle for processing and temporary storage. The feeder typically is encased in a feeder housing, which may be connected to the vehicle chassis by hydraulic cylinders, in order to allow the header to move relative to the chassis. At times, it may be necessary to extend the hydraulic cylinders to raise the header out of contact with the ground. For example, it may be desirable to raise the header during road transport and other non-harvesting movements, and to allow service of the header and related parts. Under these circumstances (and especially during service), it may be desirable to lock the feeder in the raised position to inhibit accidental lowering of the feeder and header.

One way to lock the feeder in the raised position is to place a blocking member around the piston member of a hydraulic actuator that connects the feeder (and thus the header) to the vehicle chassis. For example, a lock in the form of a rigid rod or shaft having an open slot along the side can be slipped over the piston when it is extended from the cylinder, with the ends of the lock terminating adjacent to the two exposed ends of the piston. One end of the lock rests against the end face of the cylinder, and the other end of the lock rests against the end fitting of the cylinder (or another adjacent structure, such as a clevis into which the end fitting is installed), thereby preventing the piston from retracting into the cylinder.

It is also known to connect multiple cylinder locks to each other, such that they can be simultaneously moved into place over respective pistons. U.S. Pat. No. 4,529,215, which is incorporated herein by reference, discloses a cylinder lock member in the form of two straps that are pivotally connected to the free end of the piston. Multiple lock members may be connected to each other by a pivot shaft that extends between the cylinder assemblies. In use, the lock members rotate out of the plane defined by the cylinder assemblies. This requires a large clear space adjacent to the cylinder assemblies, and limits or prohibits the applicability of this mechanism when there is no free space to allow the lock members to rotate. Thus, such a mechanism is only feasible when there is sufficient room for the system.

While various cylinder lock mechanisms are known, it has been found that they can be cumbersome and time-consuming to operate, and may not have sufficient strength to hold large modern headers and feeders.

This description of the background is provided to assist with an understanding of the following explanations of exemplary embodiments, and is not an admission that any or all of this background information is necessarily prior art.

SUMMARY OF THE INVENTION

In one exemplary aspect, there is provided a piston lock system comprising: a first cylinder extending from a first fixed cylinder end to a first free cylinder end; a first rod receiver fixed to the first cylinder; a first piston extending through the first free cylinder end from a first sliding piston end contained in the first cylinder to a first free piston end located outside the first cylinder; a first rod extending, parallel to the first piston, from a first fixed rod end secured to move with the first free piston end to a first sliding rod end located within the first rod receiver, wherein the first piston and first rod are movable relative to the first cylinder and first rod receiver between a first retracted position and a first extended position, with the first free piston end and first fixed rod end being farther from the first free cylinder end in the first extended position than in the first retracted position; and a first lock pin mounted to the first rod receiver and movable between a first unlocked position in which the first lock pin does not intersect a path of the first rod, and a first locked position in which the first lock pin intersects the path of the first rod and prevents the first rod and first piston from moving from the first extended position to the first retracted position.

In another exemplary aspect, there is provided an agricultural combine comprising: a chassis configured for movement on a surface; a feeder housing pivotally connected to the chassis; and a piston lock system as described in the foregoing aspect and examples.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide piston lock systems which may be used in agricultural equipment (e.g., combines, windrowers, etc.), or in other environments. However, the invention is not limited to any particular application except as may be specifically recited in the claims.

Figure 1:
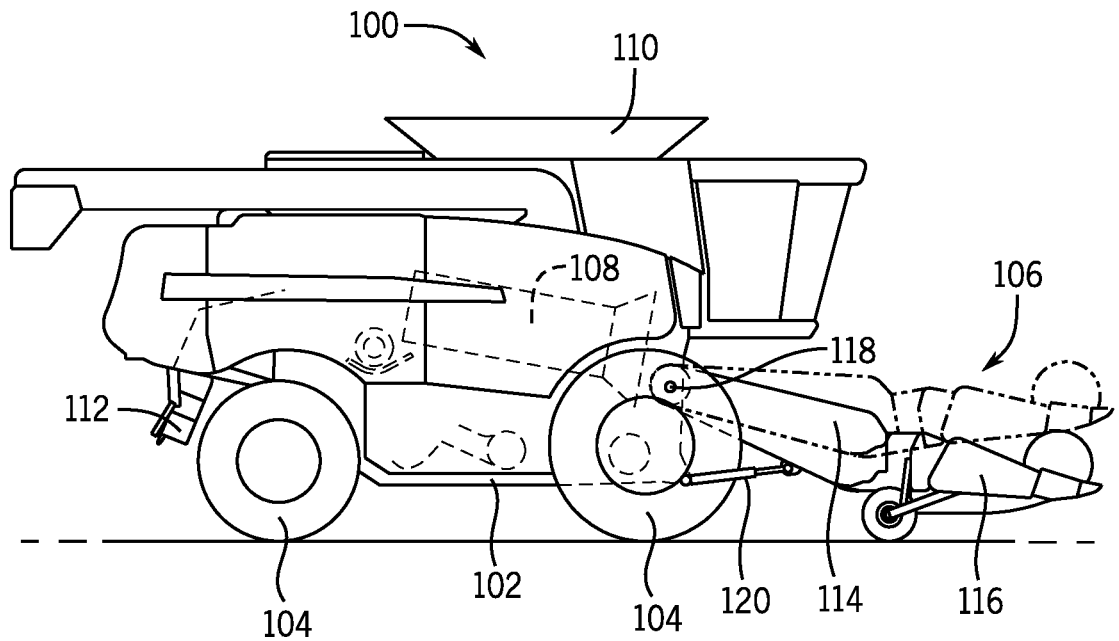
FIG. 1 schematically illustrates a side view of an example of an agricultural combine having a piston lock system such as described herein.

Referring to FIG. 1, an example of an agricultural vehicle 100, which in this case is an agricultural combine, is schematically illustrated. The vehicle 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "material other than grain," "MoG," or "residue"). The separated grain is stored in a hopper 110, and the MoG is evacuated to the trailing path of the vehicle 100 by a spreader 112.

The header assembly 106 comprises a feeder housing 114 and a header 116. The feeder housing 114 is pivotally connected to the chassis 102 at a horizontal pivot 118. One or more actuators 120 are connected between the chassis 102 and the feeder housing 114. Each actuator comprises a hydraulic cylinder and piston assembly with a piston lock system, such as described in more detail below.

The features described in relation to FIG. 1 are generally conventional, except for the actuators, and particularly the piston lock system, and no further explanations of their structures or operations are necessary.

Figure 2:
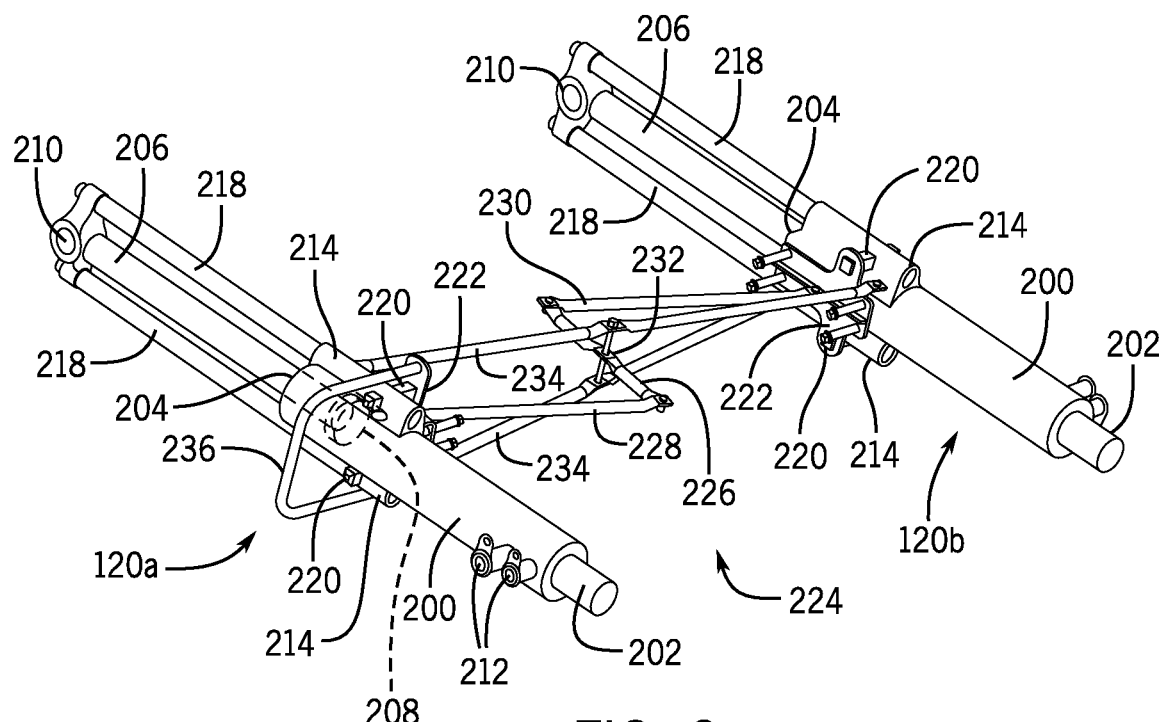
FIG. 2 is an isometric view of an exemplary embodiment of a piston lock system.

Referring now to FIG. 2, a first example of a piston lock system is shown and described in detail. In this case, the piston lock system is shown installed on a first actuator 120a and a second actuator 120b, but it will be appreciated that features of the piston lock system may be implemented on a single actuator.

Each actuator 120 comprises a cylinder 200 extending from a fixed cylinder end 202 to a free cylinder end 204, and a piston 206 extending through the free cylinder end 204 from a sliding piston end 208 to a free piston end 210. The sliding piston end 208 is contained in the cylinder 200, and the free piston end 210 is located outside the cylinder 200. The piston 206 is slidable relative to the cylinder 200 in a manner that is conventional in the art of hydraulic actuators. For example, a hydraulic system may include a one or more hydraulic ports 212 that are fluidly connected to the interior of the cylinder, and configured to convey pressurized hydraulic fluid to extend or retract the piston 206 relative to the cylinder 200. Such hydraulic systems are conventional, and need not be described in further detail herein.

Figure 5A:
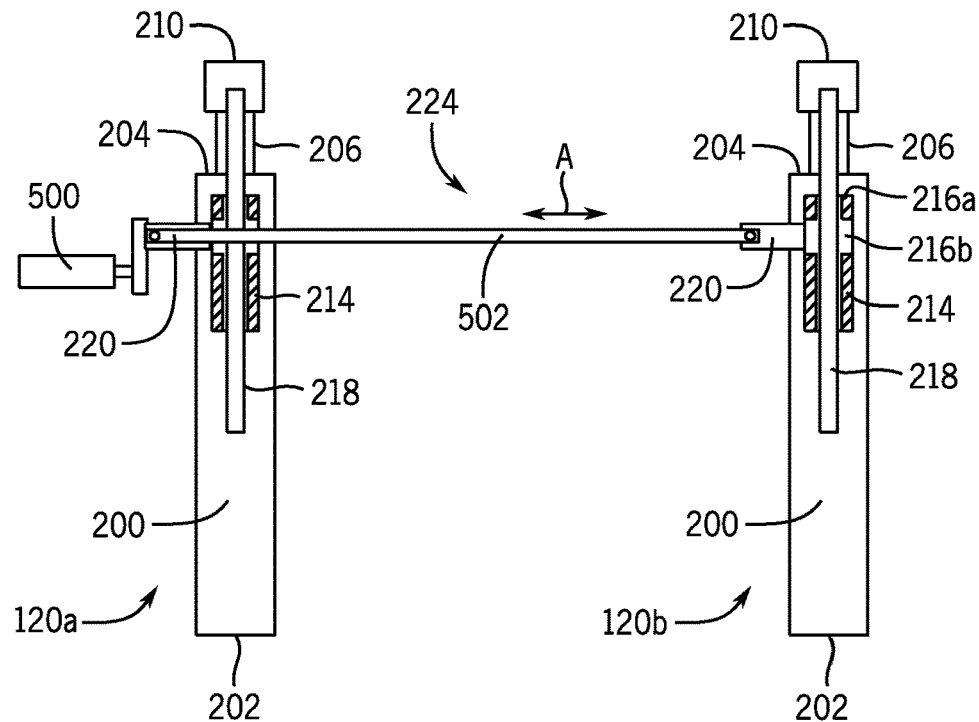
FIGS. 5A and 5B are top plan views of another piston lock system, shown in the unlocked and retracted position, and the extended and locked position, respectively.

At least one rod receiver 214 is fixed to each cylinder 200. In the shown example, each cylinder 200 has two rod receivers 214 located on opposite sides of the cylinder 200. Each rod receiver 214 comprises a housing-like structure having a longitudinal passage 216a that is oriented in parallel with the sliding direction of the piston 206, and a lateral passage 216b oriented at an angle to the sliding direction of the piston 206. Examples of the longitudinal passage 216a and lateral passage 216b are shown in FIG. 5A. The lateral passage 216b includes a wall facing towards the free cylinder end 204, which serves as a surface that bears loads to lock the piston 206 in position. to this end, the lateral passage 216b preferably extends perpendicular to the sliding direction of the piston 206, but this is not strictly required.

At least one rod 218 is attached to each piston 206. In the shown example, there are two rods 218 attached to opposite sides of each piston 206. Each rod 218 extends, parallel to the piston 206, from a fixed rod end that is secured to the free piston end 210, to a free rod end that extends into a respective rod receiver 214. The fixed rod end, and thus the entire rod 218, is configured to move in unison with the free piston end 210. For example, the rod 218 may be attached by a bolt, adhesives or welding to a boss extending from a side of the free piston end 210.

Figure 5B:
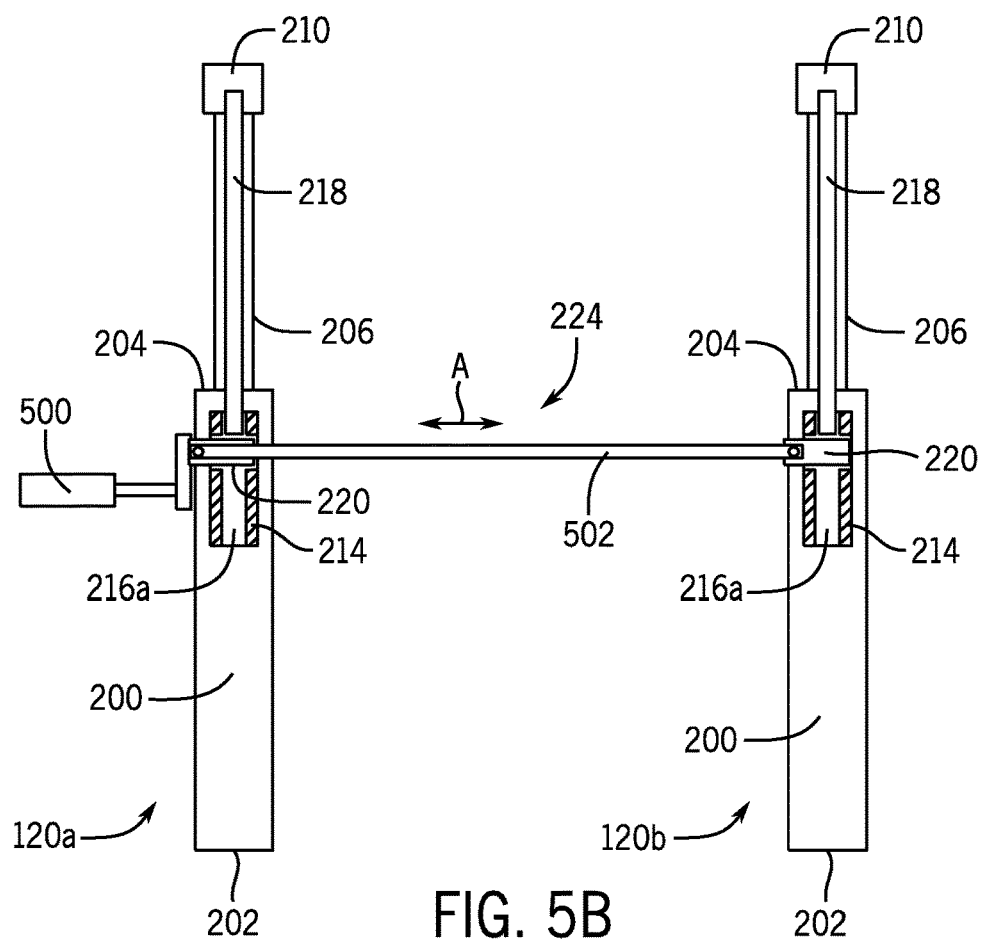

As shown, for example in the embodiment shown in FIGS. 5A and 5B, the pistons 206 and rods 218 are telescopically movable relative to the respective cylinders 200 and rod receivers 214 between a retracted position (FIG. 5A) and an extended position (FIG. 5B). The free piston ends 210 and fixed rod ends are farther from the free cylinder ends 204 in the extended position than in the retracted position. As noted above, suitable hydraulic controls may be used to extend and retract the pistons 206 relative to the cylinders 200.

At least one lock pin 220 is mounted to each cylinder 200. For example, a lock pin 220 may be slidingly connected to each rod receiver 214. The lock pins 220 are movable between an unlocked position (FIG. 3A) in which the lock pins 220 do not intersect a path of the respective rod 218, and a locked position (FIG. 3B) in which the lock pin 220 intersects the path of the respective rod 218. In the locked position, each lock pin 220 is captured between the free end of rod 218 and a wall of the lateral passage 216, and thus prevents the rod 218 and piston 206 from moving from the extended position to the retracted position.

While it is envisioned that the lock pins 220 may be separately moved between their respective locked and unlocked positions, it is more preferred to provide a mechanism to simultaneously operate all of the lock pins 220. This provides greater assurance that all of the lock pins 220 are properly positioned to prevent the pistons 206 from inadvertently retracting from the extended position towards the retracted position. In the example of FIGS. 2-4B. The lock pins 220 associated with each cylinder 200 are connected to each other by a plate 222, to thereby cause them to move in unison. In addition, the lock pins 220 from one actuator 120a are connected to the lock pins 220 of the other actuator 120b by a control link 224 that is configured to simultaneously move the lock pins 220 of the first actuator 120a with the lock pins 220 of the second actuator 120b between their respective locked and unlocked positions In this example, the control link 224 comprises a central transfer link 226, a first connecting link 228 joining the lock pins 220 of the first actuator 120a to the transfer link 226, and a second connecting link 230 joining the lock pins 220 of the second actuator 120b to the transfer link. The transfer link is pivotally mounted at a transfer link pivot 232. The transfer link pivot 232 is fixed to move in unison with the actuators 120a, 120b, and thus maintains an appropriate position to anchor the transfer link 226 throughout the range of motion of the entire assembly. For example, the transfer link pivot 232 may be secured to one or both cylinders 200 by one or more braces, such as the illustrated cross braces 234. The cross braces 234 may be secured to the cylinders 200 by a direct connection or by connection to the rod receivers 214.

When installed on a vehicle 100, the cylinders 200 are configured to be coplanar or parallel throughout their respective ranges of motion. When coplanar, the fixed cylinder ends 202 and free piston ends 210 all lie in a common plane. When parallel, the fixed cylinder ends 202 and free piston ends 210 all lie in a common plane, and the cylinders 200 and pistons 206 are parallel within the common plane. In either case, some variation may occur during regular use due to differential loading and slight differences in hydraulic system operations. In either case, the cylinders 200 define a plane between them, and the transfer link pivot 232 may be oriented with a rotation axis that extends orthogonal to the plane defined between the two cylinders 200. The transfer link pivot 232 may comprise a pin or the like that extends orthogonal to this plane. As will be clear from the following explanation of the operation of the control link 224, this orthogonal orientation allows the control link 224 to remain generally within the plane throughout the range of motion, leading to a more compact system.

The first connecting link 228 and second connecting link 230 are attached by pivots to opposite ends of the transfer link 226, with the transfer link pivot 232 being approximately midway between the connections to the two connecting links 228, 230. Thus, movement of one connecting link 228 causes a corresponding opposite movement of the other connecting link 230. Each connecting link 228, 230 is also connected, at its opposite end, to one of the lock pins 220 or (if used) the lock pin plate 222. Thus, movement of a lock pin 220 on one actuator 120*a* causes a simultaneous and opposite movement of a connected lock pin 220 on the other actuator 120*b*.

The control link 224 may be operated using any suitable mechanism. For example, in FIGS. 2-4B, a handle 236 may be connected to the lock pins 220 or lock pin plate 222 of one actuator 120*a*. The handle 236 is positioned and configured for manual operation by a technician. For example, the handle 236 may comprise an elongated bar that is located on a side of the cylinder 200 opposite the control link 224, to allow operation without having to enter the space between the two actuators 120*a*, 120*b*. The handle 236 also may include a service lock 238 (FIG. 4B) to prevent inadvertent operation to move the lock pins 220 from the locked position to the unlocked position. The service lock 238 may comprise, for example, a pin that is insertable into a hole in the end of the lock pin 220, to prevent withdrawal from the locked position. The control link 224 also may be operated by a remote system, such as described below. Other alternatives and variations will be apparent to persons of ordinary skill in the art in view of the present disclosure.

Figure 3A:
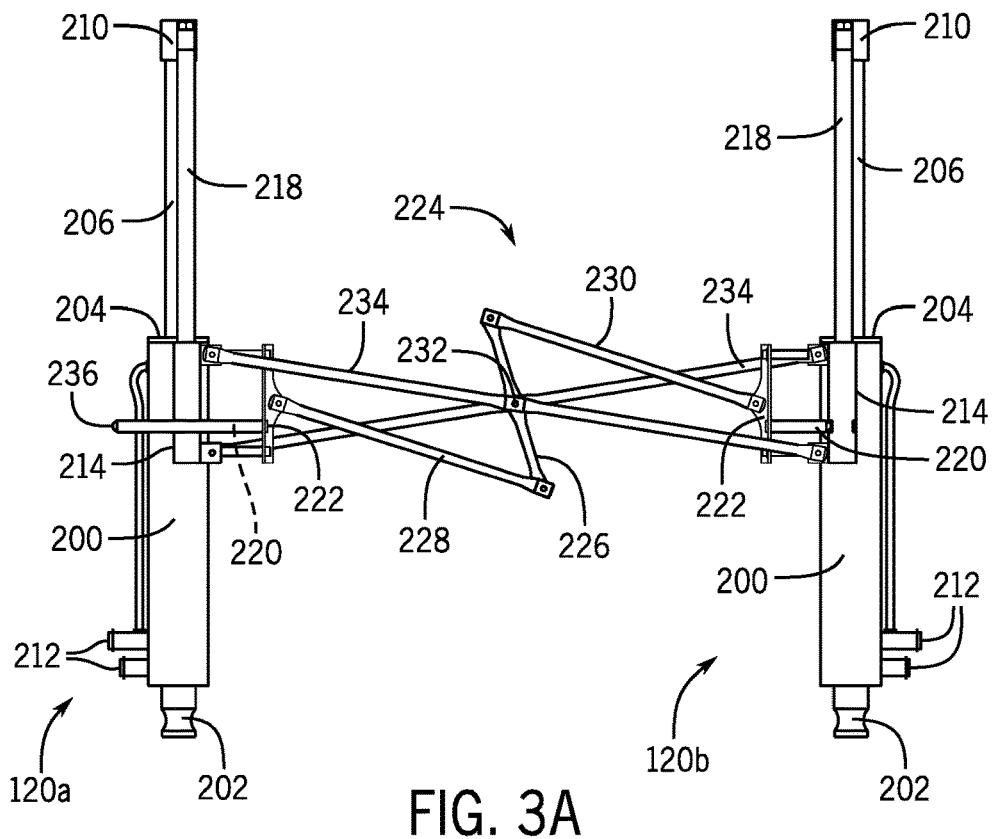
FIGS. 3A and 3B are top plan views of the piston lock system of FIG. 2, shown in the unlocked and locked positions, respectively.
Figure 3B:
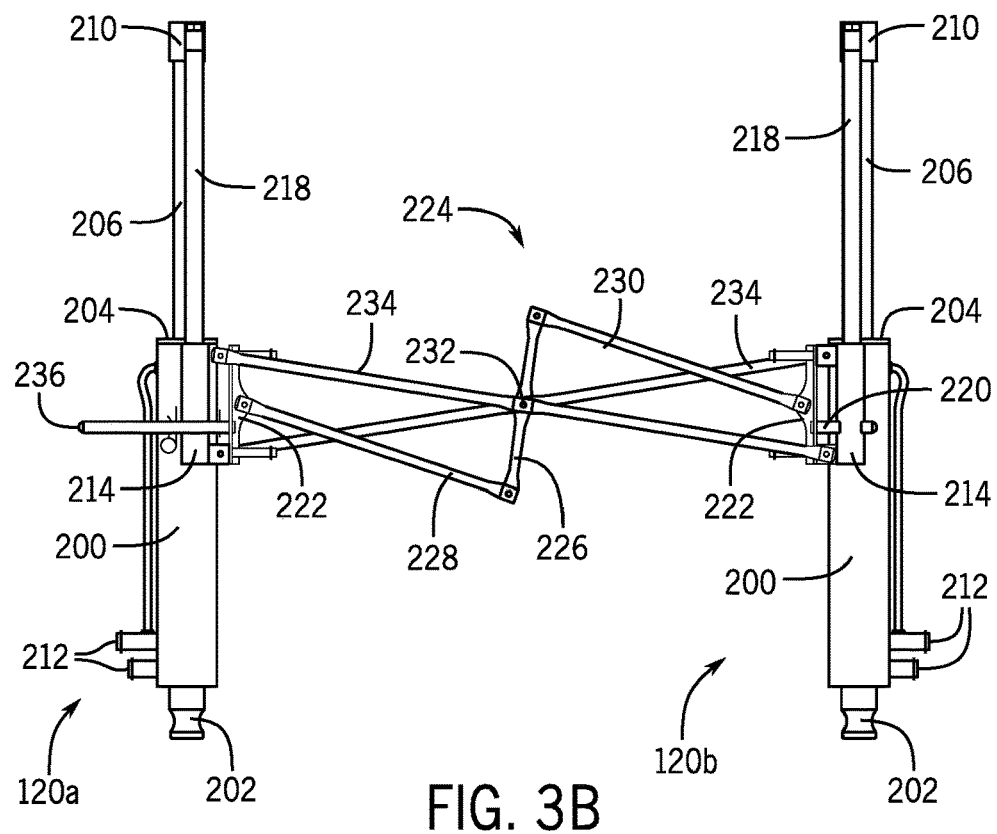
Figure 4A:
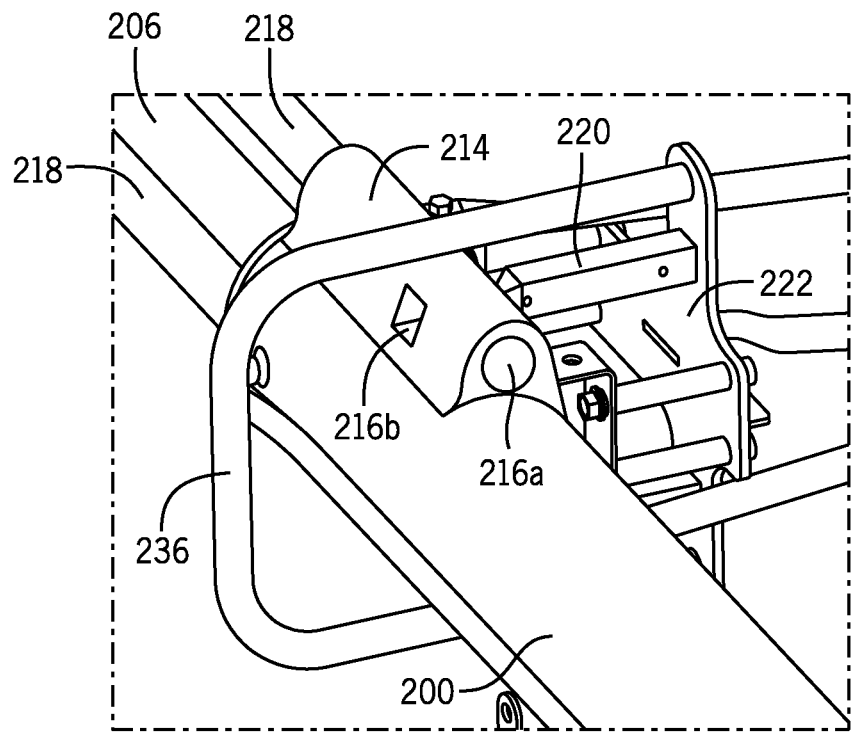
FIGS. 4A and 4B are isometric views of a portion of the piston lock system of FIG. 2, shown in the unlocked and locked positions, respectively.
Figure 4B:
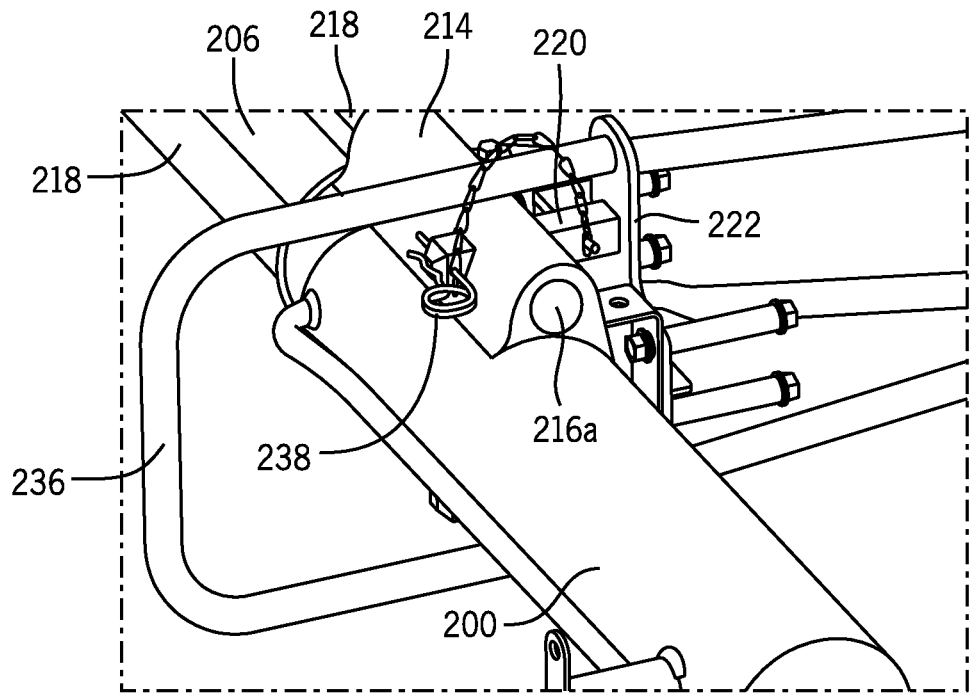

Referring now to FIGS. 3A-4B, the operation of the lock pins 220 is shown in more detail. FIGS. 3A and 4A show the lock pins 220 in the unlocked position, and FIGS. 3B and 4B show the lock pins 220 in the locked position. In this case, the control link 224 is located entirely in a space between the two cylinders 200. During operation, the lock pins 220 of each cylinder move in opposite directions. Specifically, the lock pins 220 for the first actuator 120*a* move away from the second actuator 120*b* when moving from the unlocked position to the locked position, and the lock pins 220 for the second actuator 120*b* move away from the first actuator 120*b* when moving from the unlocked position to the locked position. The reverse operation moves the lock pins 220 to their unlocked positions.

FIGS. 5A and 5B show an alternative piston lock system. In this case, the mechanisms are generally the same as in the embodiment of FIGS. 2-4B, so this description addresses the differences between the embodiments.

First, the handle 236 is replaced by a powered actuator 500. The actuator 500 may be any suitable powered motion device, such as a pneumatic, hydraulic or electric telescoping element (e.g., a piston/cylinder assembly). The actuator 500 can be operated remotely, either by an automated control system or by a user's direct input.

Second, the control link 224 is provided in the form of a pushrod 502 that extends to connect the lock pins 220 of the first actuator 120*a* with the lock pins 220 of the second actuator 120*b*. The lock pins 220 are slidably mounted to the rod receivers 214, and the pushrod 502 is configured to move along an axis A extending between the cylinders 200 of the first and second actuators 120*a*, 120*b*. This axis A may extend perpendicular to the cylinders 200, but this is not strictly required. The pushrod 502 may be rigidly connected to the lock pins 220, or connected by pivots or other flexible connectors to allow some relative displacement between the two actuators 120*a*, 120*b* without interfering with proper operation of the lock pins 220. The pushrod 502 also may be connected directly to the lock pins 220, or to a structure that holds the lock pins 220, such as the plate 222 described above.

In use, the actuator 500 drives one end of the pushrod 502 or one set of lock pins 220, and such motion is transferred to the other lock pins by the pushrod 502. In this example, the lock pins 220 all move in the same direction between their respective locked and unlocked positions. For example, first lock pin or pins 220 of the first actuator 120*a* move towards the second actuator 120*b* when moving from the unlocked position to the locked position, and the lock pin or pins 220 of the second actuator 120*b* move away from the first actuator 120*a* when moving from the unlocked position to the locked position. This arrangement has the benefit of potentially being simpler and less prone to service requirements as the embodiment of FIGS. 2-4B, but also may be less compact due to parts of the control link 224 being outside the space between the actuators 120*a*, 120*b*. It will also be understood that this embodiment (and all other embodiments described herein) may have a manually-operated handle 236 and/or a powered actuator 500.

Figure 6A:
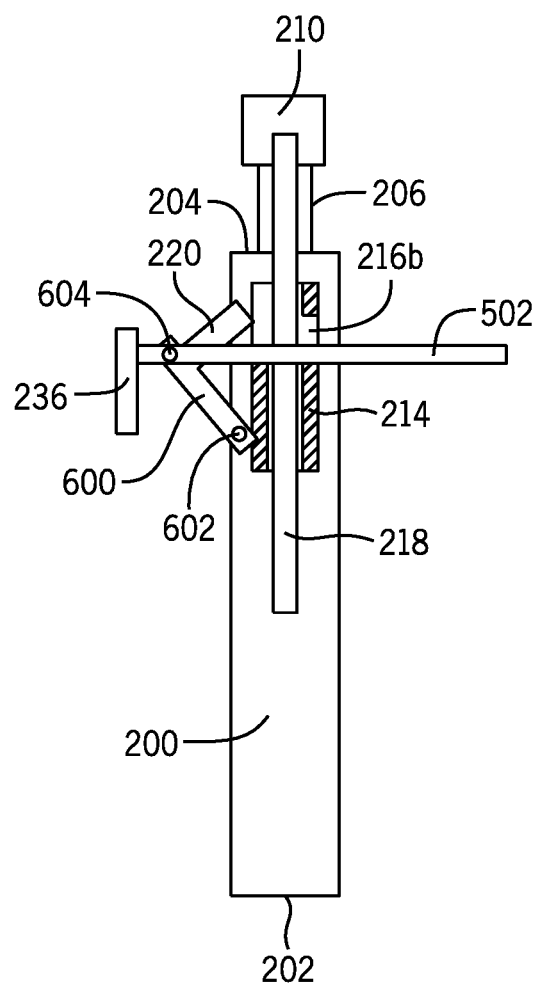
FIGS. 6A and 6B are top plan views of another piston lock system, shown in the unlocked and retracted position, and the extended and locked position, respectively.
Figure 6B:
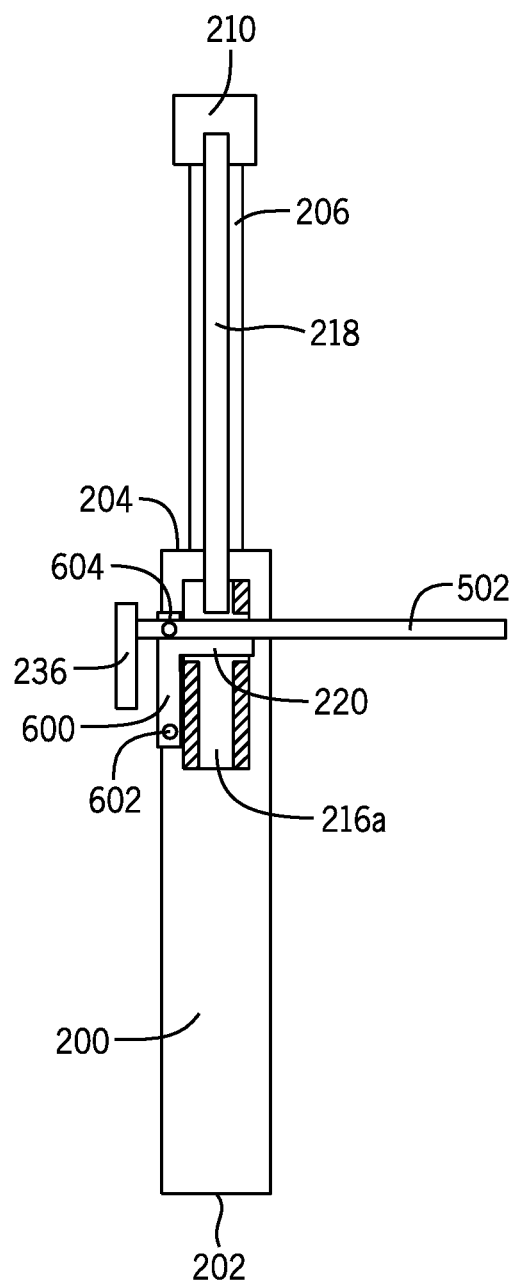
Figure 7A:
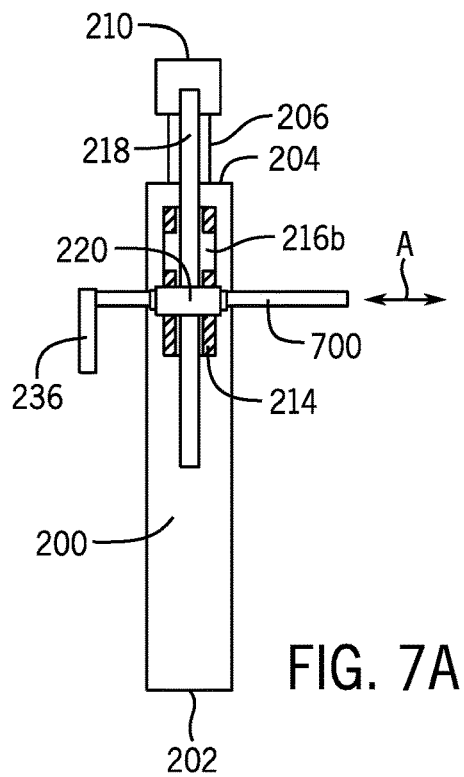
FIGS. 7A and 7B are top plan views of another piston lock system, shown in the unlocked and retracted position, and the extended and locked position, respectively.

FIGS. 6A and 6B show another alternative embodiment. In this case, the sliding lock pins 220 of the previous embodiment are replaced by rotating lock pins 220. The rotating lock pins 220 are connected by an arm 600 and a pivot 602 to the cylinder 200 and/or rod receiver 214. In this case, the control link 224 is a pushrod 502 that is operated by a handle 236. If necessary, the pushrod 502 may be connected to the arm 600 by another pivot 604, to allow the pushrod 502 to remain oriented towards a lock pin 220 on an adjacent actuator (not shown in FIGS. 6A and 6B). In use, the pushrod 236 is moved to rotate the arm 600 and place the lock pin 220 into the lateral passage 216*b*.

In other embodiments, different pivoting or moving connections may be provided between the lock pins 220 and the rod receiver 214, and other control links may be used.

FIGS. 7A-8B show another embodiment. In this case, the control link 224 comprises an axle 700 extending from the lock pin 220 of the first actuator 120*a* to the lock pin of a second actuator (not shown). The axle 700 is pivotally mounted to the cylinders 200 (either directly or via the rod receiver 214 or other structure), and configured to rotate about an axis A extending between the actuators 120*a*, 120*b*. The lock pins 220 are rigidly connected to the axle 700 by one or more offset arms 702, and thus move with the axle 700 through an arcuate path as the axle 700 rotates. A handle 236 or other control is provided to rotate the axle 700.

Figure 8A:
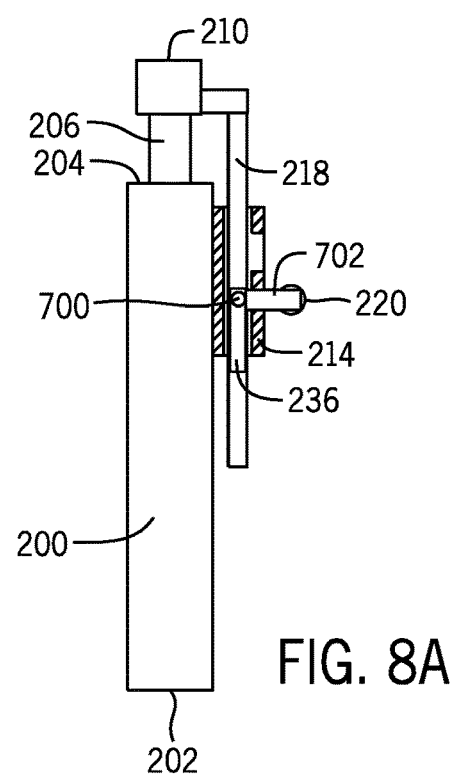
FIGS. 8A and 8B are side views of the piston lock system of FIGS. 7A and 7B, shown in the unlocked and retracted position, and the extended and locked position, respectively.
Figure 7B:
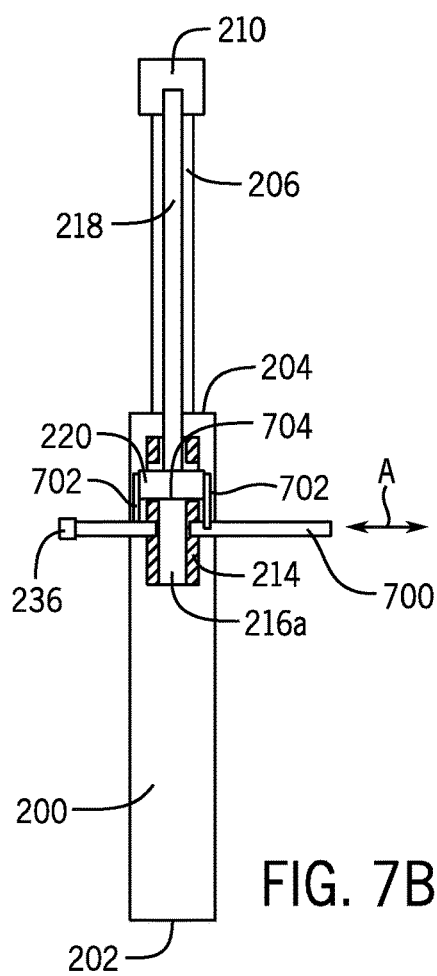
Figure 8B:
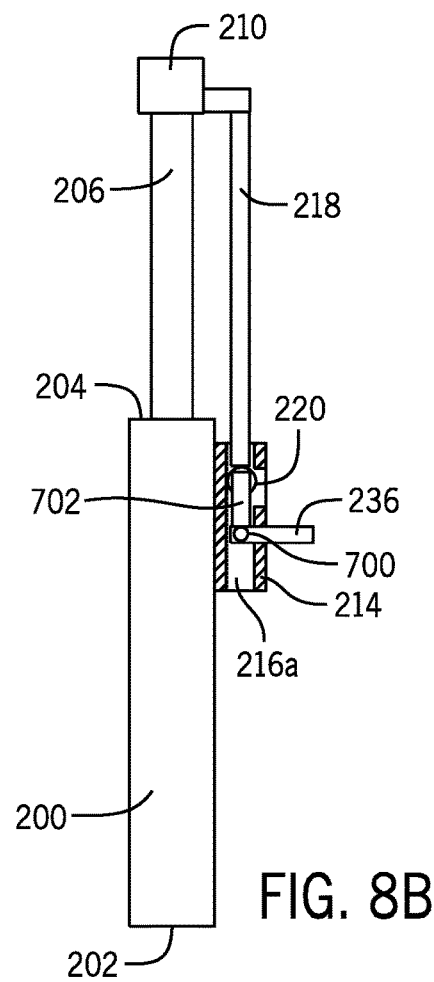

As best shown in FIGS. 8A and 8B, rotating the axle 700, such as by operating a handle 236 or other control, moves the lock pins 220 between an unlocked position (FIGS. 7A and 8A) and a locked position (FIGS. 7B and 8B). As shown in FIG. 7B, in the locked position, the lock pin 220 is positioned between the rod 218 and an inner face 704 of the rod receiver 214, and preferably in contact with both the inner face 704 and the rod 218 to provide a direct load-bearing path from the rod to the rod receiver 214. If necessary, the lock pin 220 may be connected to the axle 700 or offset arms 702 by a lost-motion mechanism (e.g., a pin that fits into a slot or oversized hole), to allow the lock pin 220 to move slightly to make contact with the surface 704.

The foregoing arrangement of direct contact and a direct load-bearing path is also preferred for the other embodiments described herein to simplify the structural requirements to support the piston 206 in the extended position. In each case, some lost motion (i.e., limited free movement between the parts) or flex may be designed into the lock pins 220 and related parts to ensure proper contact under various operating conditions and to account for potential tolerance stacking issues.

Figure 9A:
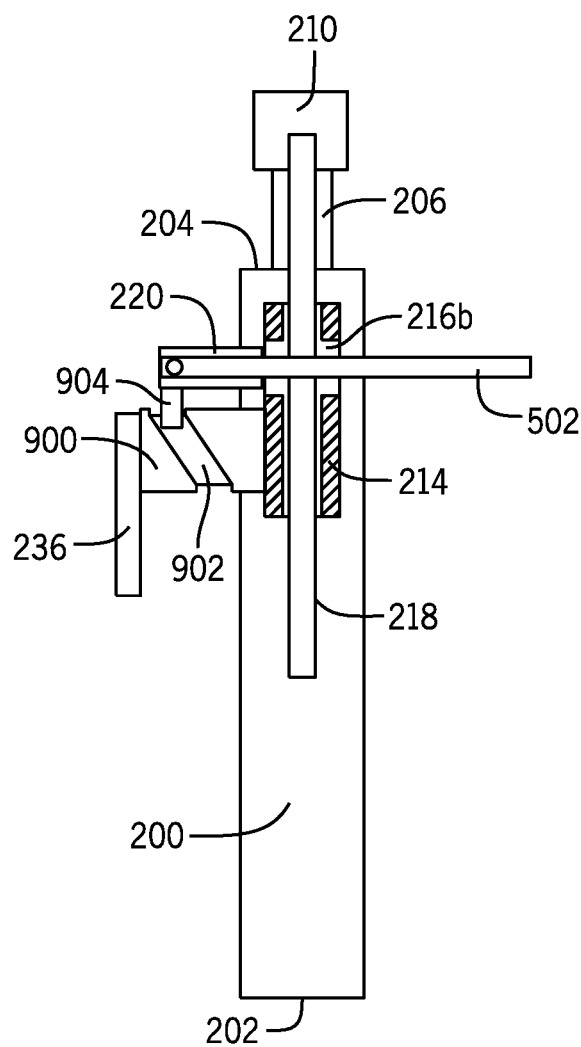
FIGS. 9A and 9B are top plan views of another piston lock system, shown in the unlocked and retracted position, and the extended and locked position, respectively.
Figure 9B:
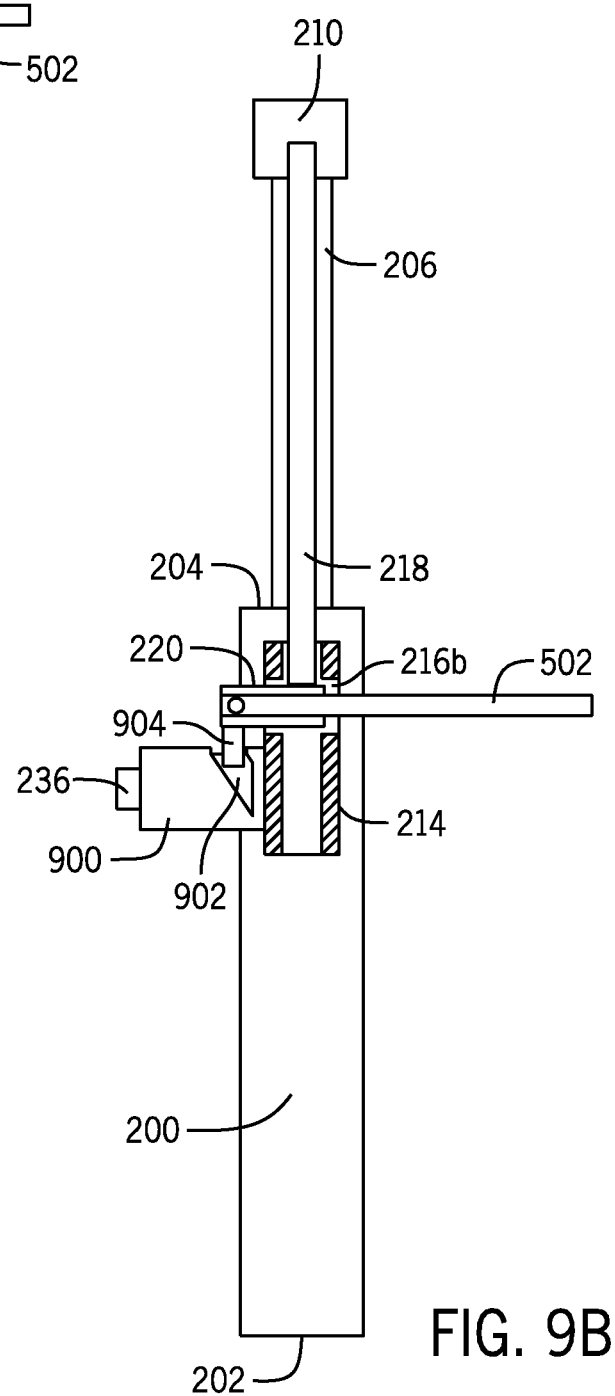

FIGS. 9A and 9B show a further embodiment, in which a cam 900 is used to move the lock pin 220 between the locked and unlocked positions. The cam 900 is rotatably mounted to the cylinder 200 or rod receiver 214, and includes a helical cam track 902. A cam follower 904, such as a pin, is attached to the lock pin 220 (or to a plate 222 or other comparable structure), and positioned within the cam track. A handle 236 is provided to rotate the cam 900. Rotating the cam 900 causes the cam track 902 to drive the cam follower 904, thus moving the lock pin 220 between the locked and unlocked positions.

In the shown embodiment, a pushrod 502 is attached to the lock pin 220 to transfer motion to another lock pin on an adjacent actuator, but this is not strictly required. In other examples, there may not be another actuator, or the other actuator or actuators may have separate lock pin controls. In still another example, each actuator may have its own cam 900 or cams, and the cams of the actuators may be joined by an axle such as the axle 700 of the embodiment of FIGS. 7A-8B. In this case, rotating the axle 700 would rotate both cams 900 in unison, and each cam 900 would drive its respective lock pin 220 between the locked and unlocked positions. Other alternatives and variations will be apparent to persons of ordinary skill in the art in view of the present disclosure.

It will be appreciated that embodiments such as described herein can be used in various locations on agricultural vehicles and equipment, particularly those having multiple actuators. For example, the actuators 120a, 120b may be mounted with the fixed cylinder ends 202 connected to a vehicle chassis 102, and the free rod ends 210 connected to a feeder housing 114, or vice-versa. Such connections can be made in the manner of a conventional actuator, and thus embodiments may be provided as a retrofit assembly for an existing vehicle 100.

It is expected that embodiments will provide easier and more efficient options to lock pistons of actuators in the extended positions, and thus can improve serviceability and safety of such devices. Furthermore, embodiments having the capability to simultaneously operate lock pins on multiple actuators can have a significant benefit in cases in which locking a single actuator is not sufficient to adequately secure a load. For example, modern agricultural combine headers having two actuators can weigh too much to be reliably held by a single one of its actuators, in which case the ability to simultaneously lock both actuators is particularly desirable.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

The invention claimed is:

1. An agricultural combine comprising:
   (a) a chassis configured for movement on a surface;
   (b) a feeder housing pivotally connected to the chassis; and
   (c) a piston lock system comprising:
      (i) a first cylinder extending from a first fixed cylinder end to a first free cylinder end;
      (ii) a first rod receiver fixed to the first cylinder;
      (iii) a first piston extending through the first free cylinder end from a first sliding piston end contained in the first cylinder to a first free piston end located outside the first cylinder;
      (iv) a first rod extending, parallel to the first piston, from a first fixed rod end secured to move with the first free piston end to a first sliding rod end located within the first rod receiver, wherein the first piston and first rod are movable relative to the first cylinder and first rod receiver between a first retracted position and a first extended position, with the first free piston end and first fixed rod end being farther from the first free cylinder end in the first extended position than in the first retracted position; and
      (v) a first lock pin mounted to the first rod receiver and movable between a first unlocked position in which the first lock pin does not intersect a path of the first rod, and a first locked position in which the first lock pin intersects the path of the first rod and prevents the first rod and first piston from moving from the first extended position to the first retracted position; and
   wherein the first fixed cylinder end is operatively connected to one of the chassis and the feeder housing, and the first free piston end is operatively connected to the other of the chassis and the feeder housing.

2. The agricultural combine of claim 1, further comprising:
   a second cylinder extending from a second fixed cylinder end to a second free cylinder end;
   a second rod receiver fixed to the second cylinder;
   a second piston extending through the second free cylinder end from a second sliding piston end contained in the second cylinder to a second free piston end located outside the second cylinder;
   a second rod extending, parallel to the second piston, from a second fixed rod end secured to move with the second free piston end to a second sliding rod end located within the second rod receiver, wherein the second piston and second rod are movable relative to the second cylinder and second rod receiver between a second retracted position and a second extended position, with the second free piston end and second fixed rod end being farther from the second free cylinder end in the second extended position than in the second retracted position; and
   a second lock pin mounted to the second rod receiver and movable between a second unlocked position in which second lock pin does not intersect a path of the second rod, and a second locked position in which the second lock pin intersects the path of the second rod and prevents the second rod and second piston from moving from the second extended position to the second retracted position.

3. The agricultural combine of claim 2, further comprising a control link operatively connecting the first lock pin to the second lock pin and configured to simultaneously move the first lock pin between the first locked position and the first unlocked position, and the second lock pin between the second locked position and the second unlocked position.

4. The agricultural combine of claim 3, wherein the control link comprises:

a transfer link pivot mounted between the first cylinder and the second cylinder;
a transfer link pivotally mounted to the transfer link pivot to rotate about an axis orthogonal to a plane defined between the first cylinder and the second cylinder;
a first connecting link pivotally connected at a respective first end to the first lock pin and pivotally connected at a respective second end to a first end of the transfer link; and
a second connecting link pivotally connected at a respective first end to the second lock pin and pivotally connected at a respective second end to a second end of the transfer link, with the transfer link pivot located between the first end of the transfer link and the second end of the transfer link.

5. The agricultural combine of claim 4, wherein the transfer link pivot is connected to the first cylinder and the second cylinder by one or more braces extending from the first cylinder to the second cylinder.

6. The agricultural combine of claim 3, wherein:
the control link is located entirely in a space between the first cylinder and the second cylinder;
the first lock pin is configured to move away from the second cylinder when moving from the first unlocked position to the first locked position; and
the second lock pin is configured to move away from the first cylinder when moving from the second unlocked position to the second locked position.

7. The agricultural combine of claim 6, further comprising a handle operatively connected to the first lock pin.

8. The agricultural combine of claim 7, wherein the handle is located on a side of the first cylinder opposite the control link.

9. The agricultural combine of claim 3, wherein the control link comprises a pushrod extending from the first lock pin to the second lock pin and configured to move along an axis extending between the first cylinder and the second cylinder.

10. The agricultural combine of claim 9, wherein:
the first lock pin is configured to move towards the second cylinder when moving from the first unlocked position to the first locked position; and
the second lock pin is configured to move away from the first cylinder when moving from the second unlocked position to the second locked position.

11. The agricultural combine of claim 9, wherein:
the first lock pin is slidingly mounted to the first rod receiver;
the second lock pin is slidingly mounted to the second rod receiver; and
the pushrod is connected to the first lock pin and the second lock pin.

12. The agricultural combine of claim 9, wherein:
the first lock pin is pivotally mounted to the first rod receiver;
the second lock pin is pivotally mounted to the second rod receiver; and
the pushrod is pivotally connected to the first lock pin and the second lock pin.

13. The agricultural combine of claim 3, wherein the control link comprises an axle extending from the first lock pin to the second lock pin and pivotally mounted to the first cylinder and the second cylinder to rotate about an axis extending from the first cylinder to the second cylinder.

14. The agricultural combine of claim 13, wherein the first lock pin and the second lock pin are rigidly connected to move with the axle.

15. The agricultural combine of claim 1, wherein:
the first rod receiver comprises a pair of first rod receivers located on opposite sides of the first cylinder;
the first rod comprises a pair of first rods located on opposite sides of the first piston; and
and the first lock pin comprises a pair of first lock pins located on opposite sides of the first cylinder.

16. The agricultural combine of claim 2, further comprising a cam operatively connected to the first lock pin and the second lock pin and configured to simultaneously move the first lock pin between the first locked position and the first unlocked position, and the second lock pin between the second locked position and the second unlocked position.

17. The agricultural combine of claim 2, further comprising a hydraulic system configured to simultaneously move the first piston from the first retracted position to the first extended position, and the second piston from the second retracted position to the second extended position.

18. The agricultural combine of claim 17, wherein:
the first fixed cylinder end and the second fixed cylinder end are operatively connected to one of the chassis and the feeder housing; and
the first free piston end and the second free piston end are operatively connected to the other of the chassis and the feeder housing.

19. A piston lock system comprising:
a first cylinder extending from a first fixed cylinder end to a first free cylinder end;
a first rod receiver fixed to the first cylinder;
a first piston extending through the first free cylinder end from a first sliding piston end contained in the first cylinder to a first free piston end located outside the first cylinder;
a first rod extending, parallel to the first piston, from a first fixed rod end secured to move with the first free piston end to a first sliding rod end located within the first rod receiver, wherein the first piston and first rod are movable relative to the first cylinder and first rod receiver between a first retracted position and a first extended position, with the first free piston end and first fixed rod end being farther from the first free cylinder end in the first extended position than in the first retracted position;
a first lock pin mounted to the first rod receiver and movable between a first unlocked position in which the first lock pin does not intersect a path of the first rod, and a first locked position in which the first lock pin intersects the path of the first rod and prevents the first rod and first piston from moving from the first extended position to the first retracted position; and
a cam operatively connected to the first lock pin and configured to move the first lock pin between the first locked position and the first unlocked position.

20. An agricultural combine comprising:
a chassis configured for movement on a surface;
a feeder housing pivotally connected to the chassis;
a first cylinder extending from a first fixed cylinder end to a first free cylinder end;
a first rod receiver fixed to the first cylinder;
a first piston extending through the first free cylinder end from a first sliding piston end contained in the first cylinder to a first free piston end located outside the first cylinder;
a first rod extending, parallel to the first piston, from a first fixed rod end secured to move with the first free piston end to a first sliding rod end located within the first rod receiver, wherein the first piston and first rod are movable relative to the first cylinder and first rod receiver between a first retracted position and a first extended position, with the first free piston end and first fixed rod end being farther from the first free cylinder end in the first extended position than in the first retracted position; and a first lock pin mounted to the first rod receiver and movable between a first unlocked position in which the first lock pin does not intersect a path of the first rod, and a first locked position in which the first lock pin intersects the path of the first rod and prevents the first rod and first piston from moving from the first extended position to the first retracted position;

a second cylinder extending from a second fixed cylinder end to a second free cylinder end;

a second rod receiver fixed to the second cylinder;

a second piston extending through the second free cylinder end from a second sliding piston end contained in the second cylinder to a second free piston end located outside the second cylinder;

a second rod extending, parallel to the second piston, from a second fixed rod end secured to move with the second free piston end to a second sliding rod end located within the second rod receiver, wherein the second piston and second rod are movable relative to the second cylinder and second rod receiver between a second retracted position and a second extended position, with the second free piston end and second fixed rod end being farther from the second free cylinder end in the second extended position than in the second retracted position;

a second lock pin mounted to the second rod receiver and movable between a second unlocked position in which second lock pin does not intersect a path of the second rod, and a second locked position in which the second lock pin intersects the path of the second rod and prevents the second rod and second piston from moving from the second extended position to the second retracted position; and a hydraulic system configured to simultaneously move the first piston from the first retracted position to the first extended position, and the second piston from the second retracted position to the second extended position;

wherein:

the first fixed cylinder end and the second fixed cylinder end are operatively connected to one of the chassis and the feeder housing, and the first free piston end and the second free piston end are operatively connected to the other of the chassis and the feeder housing.

* * * * *